(12) United States Patent
Franke

(10) Patent No.: US 8,435,058 B2
(45) Date of Patent: May 7, 2013

(54) COUPLING ELEMENT FOR HYDRAULIC LINES

(75) Inventor: Andreas Franke, Wuppertal (DE)

(73) Assignee: Ford Global Technologies, LLC, Dearborn, MI (US)

(*) Notice: Subject to any disclaimer, the term of this patent is extended or adjusted under 35 U.S.C. 154(b) by 39 days.

(21) Appl. No.: 13/283,349

(22) Filed: Oct. 27, 2011

(65) Prior Publication Data
US 2012/0103443 A1    May 3, 2012

(30) Foreign Application Priority Data
Oct. 27, 2010  (DE) .................. 10 2010 060 208

(51) Int. Cl.
*H01R 9/00* (2006.01)
(52) U.S. Cl.
USPC .............................. 439/181; 439/92; 439/191
(58) Field of Classification Search .................. 439/181, 439/92, 191, 192, 96
See application file for complete search history.

(56) References Cited

U.S. PATENT DOCUMENTS

| | | | |
|---|---|---|---|
| 3,753,205 A | 8/1973 | Tuger | |
| 4,729,583 A | 3/1988 | Lalikos et al. | |
| 5,222,770 A * | 6/1993 | Helevirta | 285/53 |
| 7,168,416 B2 * | 1/2007 | Powell et al. | 123/509 |
| 2008/0042439 A1 * | 2/2008 | Athalye et al. | 285/405 |
| 2008/0078880 A1 * | 4/2008 | Petit | 244/135 R |
| 2012/0103461 A1 * | 5/2012 | Franke | 141/1 |

FOREIGN PATENT DOCUMENTS

| | | |
|---|---|---|
| DE | 2639237 A1 | 3/1978 |
| DE | 102005061606 B4 | 11/2007 |

OTHER PUBLICATIONS

Franke, Andreas, "Hose Coupling Element," U.S. Appl. No. 13/283,336, filed Oct. 27, 2011, 21 pages.

* cited by examiner

*Primary Examiner* — Gary F. Paumen
(74) *Attorney, Agent, or Firm* — Julia Voutyras; Alleman Hall McCoy Russell & Tuttle LLP

(57) ABSTRACT

A coupling system is provided. The system comprises a first hydraulic line element that is electrically conductive at least inside, a second hydraulic line element, an electrically conductive intermediate element that projects by a first end thereof at least partially into the first hydraulic line element, a releasable fastening element configured to couple the electrically conductive intermediate element to the second hydraulic line element, and a conducting device coupled to a predetermined electric potential and connected in an electrically conductive manner to the electrically conductive intermediate element. In this way, the two hydraulic lines can be coupled in a releasable manner and dissipate electric charge that may build up in, for example, a fuel system.

20 Claims, 4 Drawing Sheets

COUPLING ELEMENT FOR HYDRAULIC LINES

RELATED APPLICATIONS

The present application claims priority to German Patent Application No. 102010060208.6, filed on Oct. 27, 2010, the entire contents of which are hereby incorporated by reference for all purposes.

FIELD

The disclosure relates to a coupling element for coupling two hydraulic lines, wherein one of said lines is a hose-like line.

BACKGROUND AND SUMMARY

Hydraulic lines may include all lines which are suitable for the passage of liquids or mixtures of liquids and gases. Lines of this type can be used, for example, as part of a fuel supply system, such as in a motor vehicle, and in the supply of a heating system, a power plant or the like. The fuel supply system of a motor vehicle, which is driven, for example, by a spark ignition or diesel internal combustion engine, typically has a fuel tank with an active or passive delivery module in order to supply the internal combustion engine with fuel via fuel lines. Fuel lines of this type comprise a multiplicity of line elements which can be designed, for example, in the form of tubes, flexible hoses or the like.

Since a fuel supply system includes a multiplicity of components, it is expedient to be able to couple the individual components in a simple manner and optionally also to be able to release them from one another again. For a releasable fastening of hoses, connectors are known, as described, for example, in U.S. Pat. No. 4,729,583. The connector presented therein includes two parts, wherein, in particular, good sealing to the hose and a stable design are intended to be made possible.

In a fuel supply system, the risk of an electrostatic charge may also be taken into consideration. Since fuel flows through the various components of the fuel supply system, such as through a primary fuel pump, optionally provided auxiliary pumps, through a fuel filter or through various valves and pipes, an electrostatic charge generated in the various conductive components of the fuel supply system may occur. In order to ensure electrical dissipation of such a charge, in fuel supply systems the components in the fuel flow or all of the components are constructed of conductive material and are coupled to the vehicle ground. This generally takes place by electric lines or else by direct fitting to the vehicle ground.

Dissipation of a possible electrostatic charge is readily possible in components of the fuel supply system that are produced from electrically conductive material, such as from metal and conductive polymer. However, materials of this type have a number of disadvantages. For example, conductive plastic is customarily more expensive and more brittle than nonconductive polymers which are typically used.

In order to deliver fuel from the delivery module/module pot to the associated flange, use is customarily made of a corrugated hose. The latter is customarily coupled nonreleasably to the flange and the delivery module via connectors with shaped profiles. It has turned out that a hose of this type has to be grounded for reliable operation of a motor vehicle. Said hoses are therefore entirely electrically conductive or are electrically conductive at least on the inside thereof, where said hoses are also in contact with the fuel.

Fuel supply systems are furthermore known, for example from DE 10 2005 061 606 A1, which contain a fuel delivery module which is arranged within a fuel tank. A delivery module of this type has a store for collecting the fuel from the tank and for conducting said fuel on to the internal combustion engine, and it may also contain a fuel pump. A fuel filter can be arranged within a delivery module of this type or at another location within the tank. In order to arrange the fuel delivery module and also the fuel filter within the tank, it is also known to use a tank flange which permits various inlets into the tank, such as via hydraulic and electric lines.

It is precisely in a tank flange of this type that the brittleness of electrically conductive polymers results in a reduction in the capability of being flexible in the event of loading or of withstanding forces determined in another manner, as may occur, for example, in the event of the motor vehicle having an accident. Furthermore, in the case of a conductive tank flange, electric insulation with respect to the electric power supply plug-in connectors arranged on the upper side and the picking up of signals from the level sensor are required.

The inventor herein has recognized the issues with the above approaches and provides a system to at least partly address them. In one embodiment, a coupling system comprises a first hydraulic line element that is electrically conductive at least on an inside, a second hydraulic line element, an electrically conductive intermediate element that projects by a first end thereof at least partially into the first hydraulic line element, a releasable fastening element coupling the electrically conductive intermediate element to the second hydraulic line element, and a conducting device coupled to a predetermined electric potential and connected in an electrically conductive manner to the electrically conductive intermediate element.

In this way, the intermediate element for coupling the hydraulic lines may permit releasable coupling. Additionally, because the intermediate element is itself conductive and coupled to a conducting device, electrostatic charge may be directed from the conductive interior of the first hydraulic line element to the conductive device and one or more grounded elements. This may allow the flange to be made of non-conductive materials, increasing the flange flexibility and improving component durability. Additionally, the intermediate element adds the possibility to disconnect the connection and to seal it properly afterwards.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
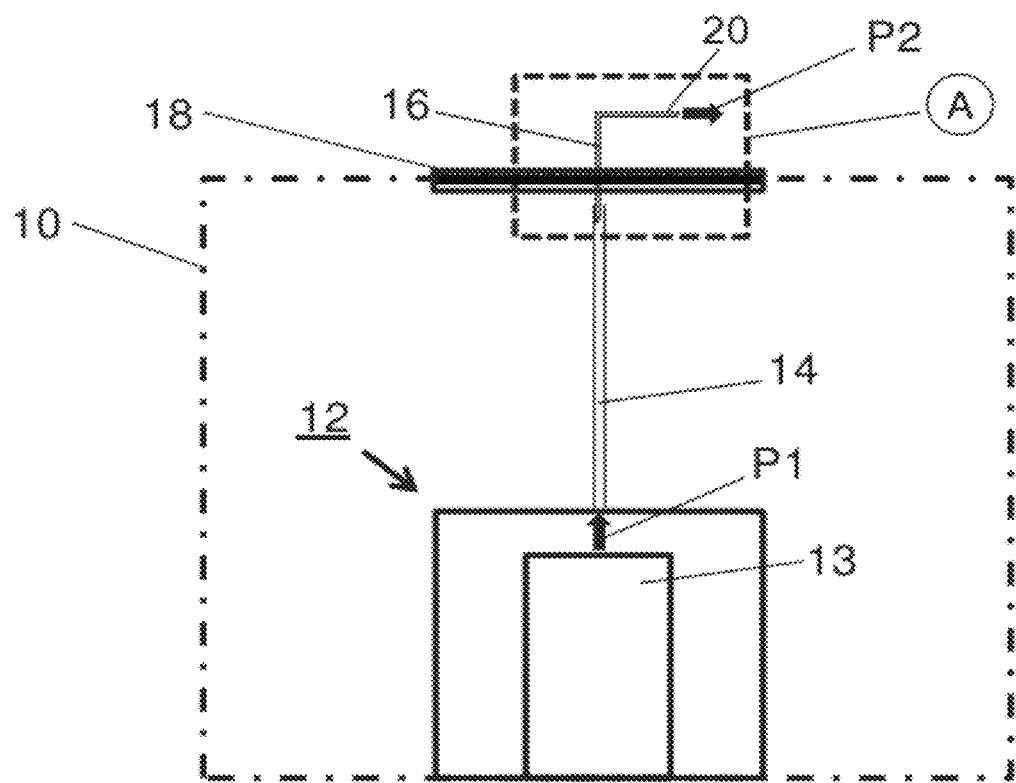
FIG. 1 schematically shows an overview of an example tank system.
Figure 2:
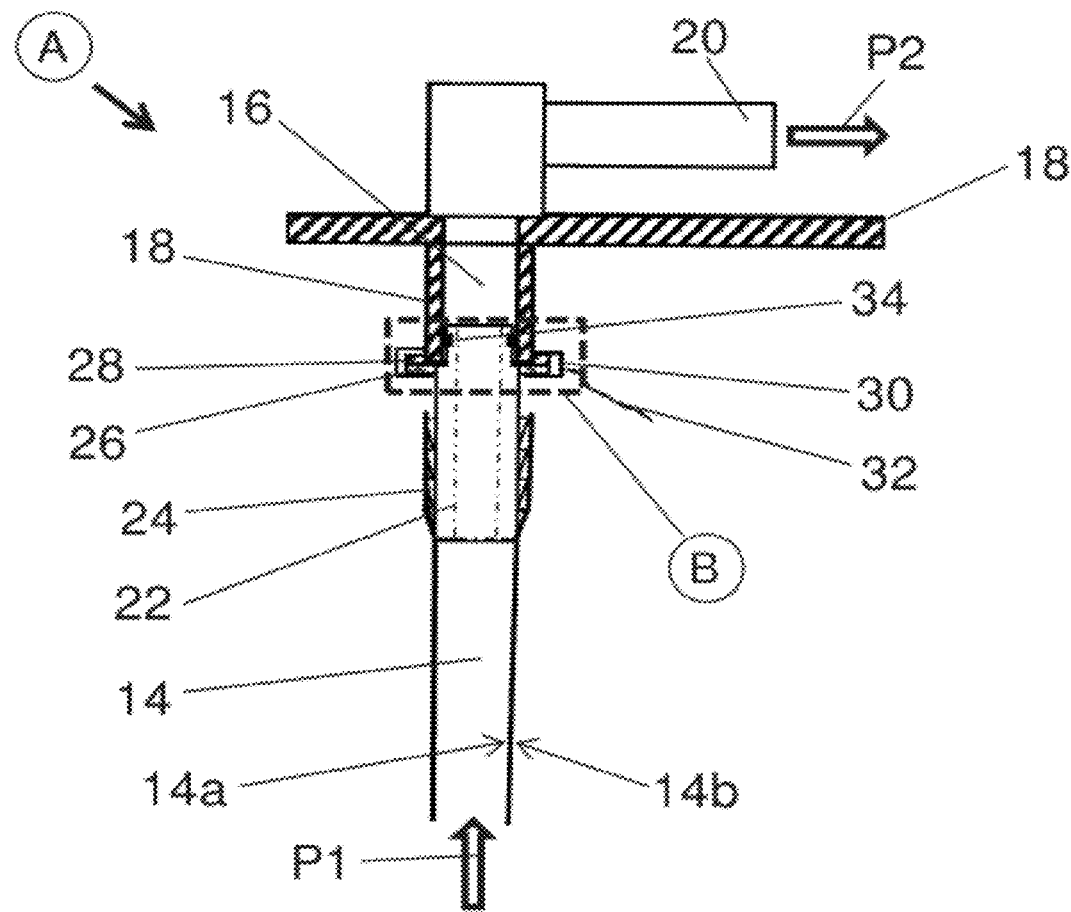
FIG. 2 shows a cross-sectional illustration of a coupling between a fuel hose and an adapter.
Figure 3:
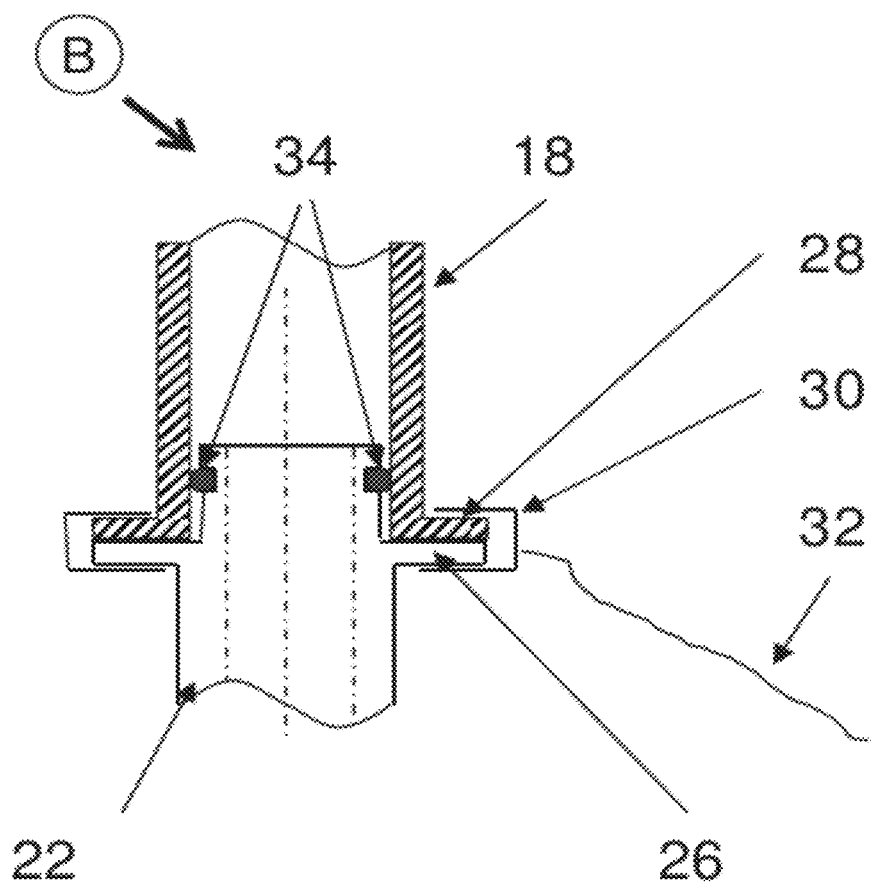
FIG. 3 shows an enlarged view of the region B from FIG. 2.
Figure 4:
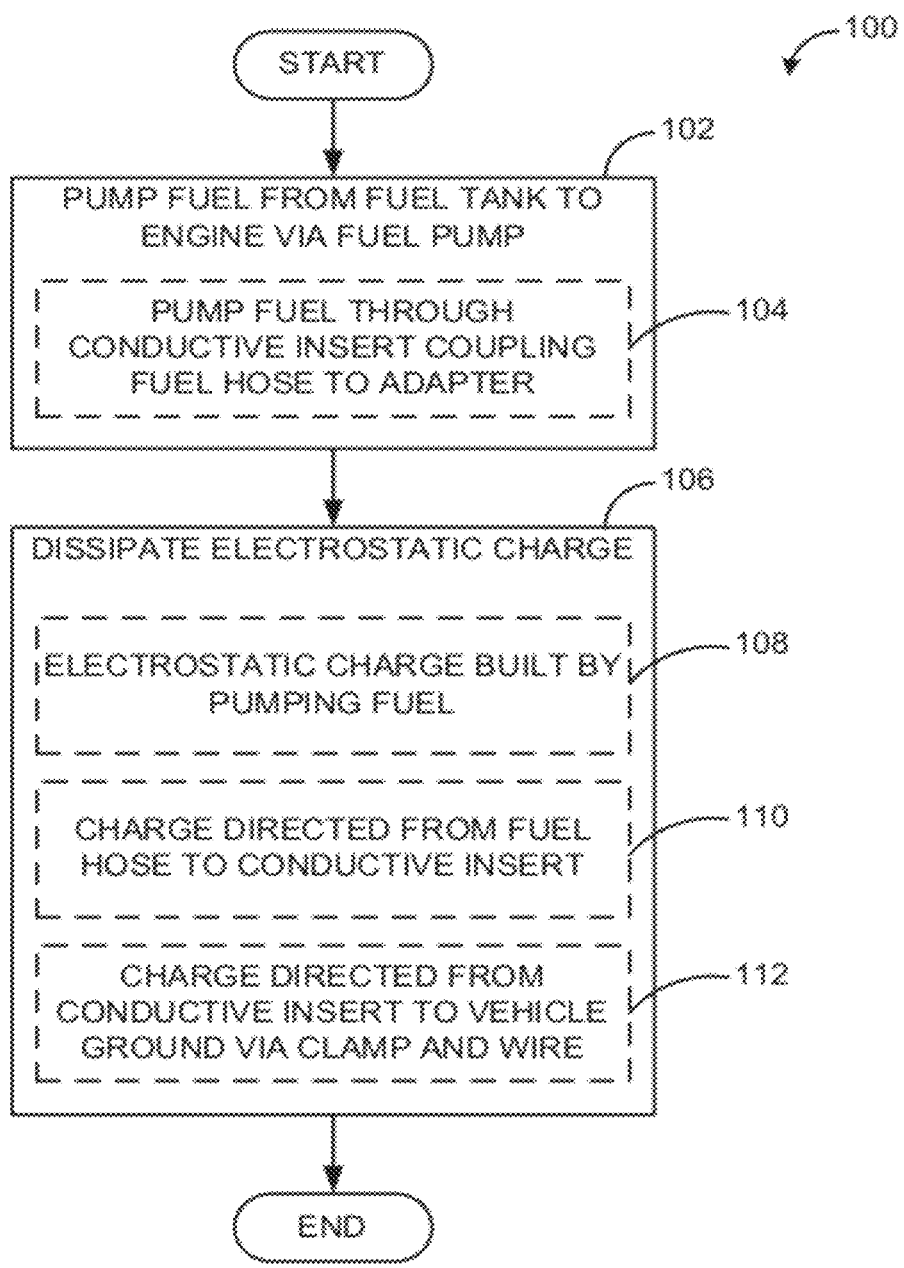
FIG. 4 is a flow chart illustrating a method for dissipating electrostatic charge according to an embodiment of the present disclosure.

Fuel hoses may be lined with conductive materials in order to direct electrostatic charge built up by pumping fuel outside the fuel system to a vehicle ground. A conductive insert may be used to couple the fuel hose to an adapter, which may be connected to a fuel line leading to the engine. The conductive insert may be connected to a wire via a conductive clamp or spring, and the wire may be coupled to the vehicle ground. FIGS. 1-3 show the conductive insert in a fuel system. FIG. 4 is a method for pumping fuel through the conductive insert. In the various figures, identical parts are provided with the same designations, and therefore said parts are generally also only described once. Although the disclosure is substantially described with reference to a fuel supply system for motor vehicles, it is in no way restricted thereto.

FIG. 1 shows schematically a rough overview of a tank system, for example in a passenger vehicle. Here, 10 indicates a tank, the interior of which contains a fuel delivery module 12 which, in this exemplary embodiment, in particular contains a fuel pump 13 and a fuel filter (not illustrated). The fuel delivery module 12 is connected via a fuel hose 14 and conductive insert 22 to an adapter 16 which is integrated in a flange 18 and has a connector 20 to connect suitable elements via which an internal combustion engine can be supplied with fuel, for example a fuel line. The flange 18 is designed so as to be able to be fitted into an opening in the tank 10 and so as therefore to close said opening. Fuel, such as gasoline or diesel fuel contained in the tank, is conveyed by the fuel delivery module 12 in accordance with the arrows P1, P2 as illustrated. While the adapter 16 is depicted in FIG. 1 as being positioned partially within the tank 10 and partially outside the tank 10, in some embodiments, the adapter 16 may be positioned fully within the tank 10, and may connect with the connector 20 at the opening of the tank 10.

The fuel hose 14 has an inside 14a, which is in contact with the conveyed fuel, and an outside 14b (also see FIG. 2). The hose can be produced from a continuously conductive material, with preferably only the inside 14a being electrically conductive, this being obtained by appropriate material, such as metal or a conductive polymer. By contrast, the outside 14b, the adapter 16 and the flange 18 are then preferably made of a material, such as typical polymers including acetal, POM, PPA, PTFE, PET or PVC, which acts in an electrically insulating manner. In this case, electrically conductive indicates that there is conductivity by which an electrostatic charge, such as may occur in particular during the flow through of fuel, can be dissipated to a sufficient extent. Accordingly, electrically insulating indicates that an electrostatic charge of this type can hardly be dissipated, if at all.

The connection between the fuel hose 14 and the adapter 16, corresponding to the region A indicated by dashed lines, is illustrated in detail in FIG. 2. It can readily be seen in this cross sectional illustration that an intermediate element 22, also referred to as a conductive insert, is inserted into the fuel hose 14, said intermediate element containing, in the lower region thereof, based on the illustration in FIG. 2, barb-shaped elements 24 which make it possible to produce the coupling to the hose 14 in a simple manner but make it relatively difficult to release said coupling again. The upper region of the intermediate element 22 is partially inserted into that part of the adapter 16 which is integrated in the flange 18. The intermediate element may be made of conductive material, such as metal or conductive polymers.

FIG. 3 shows on an enlarged scale the region B which is marked by dashed lines in FIG. 2. The intermediate element 22 has a first annular or collar-shaped bulge 26 in the upper region thereof (also see FIG. 3). In addition, the flange 18 has a second collar-shaped bulge 28 in the lower region thereof. The two collar-shaped bulges 26, 28 permit a flange-like coupling between the flange 18 and the intermediate element 22. The contact pressure required for said coupling is brought about by a fastening element, such as a holding spring 30, to which a conducting device, such as a metal wire 32, is fastened in an electrically conductive manner. The holding spring 30 is likewise electrically conductive and has, in addition to the mechanical contact, also electric contact with the bulge 26 and therefore with the intermediate element 22. The free end of the wire 32 leads to a location (not illustrated) which is at ground potential, such as a fuel pump, part of the vehicle body, or the like. In this way, electrostatic charge built up by pumping fuel from the fuel pump 13 through the fuel hose 14 to the adapter 16 may be dissipated via connection between the conductive inside 14a of the fuel hose 14, the conductive intermediate element 22, the holding spring 30, and the metal wire 32. Furthermore, there is a seal 34 which brings about effective sealing between the intermediate element 22 and the adapter 16 integrated in the flange 18.

The following function is fulfilled by the coupling arrangement illustrated in the exemplary embodiment. The fuel delivery module 12 forms a store for collecting the fuel from the tank and for conducting said fuel onto the internal combustion engine (not illustrated here). As a result, it is ensured, even under special driving situations, that fuel can be conveyed to the associated internal combustion engine even if the tank 10 is only partially filled. In a case where the module is equipped with a pump, fuel is pumped by the fuel pump 13 along the arrow P1 into the hose 14 and passes via intermediate element 22 to the adapter 16 and the connector 20 along the arrow P2 to, for example, combustion chambers (not illustrated here) which produce a fuel-air mixture and therefore supply the internal combustion engine in a manner corresponding to an operating state predetermined by a driver, such as partial load or full load. In a case where the module is not equipped with a pump, fuel is sucked by the engine. During the conveying of the fuel, there is the risk of the fuel and the devices within the fuel store, fuel supply line and combustion chambers being electrostatically charged. In order to reliably dissipate said charge, such elements may be coupled to the vehicle ground. When the fuel is conveyed through the hose 14, the charge is dissipated via the inside 14a of the hose 14, the intermediate element 22, the holding spring 30 and the wire 32 which is connected to the vehicle ground.

As a result of the connection of the hose 14, and therefore of the module 12, to the flange 18 by the releasable holding spring 30, there is the possibility of separating the hose 14 from the flange 18 in a simple manner in order, for example, to change the module 12 or parts thereof, such as the fuel filter (not illustrated here) or the fuel pump 13.

The exemplary embodiment described is merely by way of example and may be modified or supplemented in diverse ways. For example, the fuel pump 13 can be arranged outside the tank 10. A plurality of adapters 16 can be connected to the flange 18, for example in tank modules of vehicles with a diesel engine. The free end of the wire 32, or of another device suitable for the connection to ground, can be connected to a resistance card, a ground connection of the fuel pump and/or directly to a grounded part. Furthermore, it is also conceivable to produce a coupling to parts of the module 12 and to correspondingly ground said coupling.

The adapter 16 may be an integral part of the flange 18. In other embodiments, it is also possible to manufacture said adapter separately and to subsequently incorporate it in the flange. This can be undertaken, for example, by overmolding, welding, pressing-in, latching or the like, and appropriate sealing has to be taken into consideration.

Rather than the flange-like coupling between the adapter 16 and the intermediate element 22, a coupling by use of a preferably releasable clip or the like, which is grounded via a suitable mechanism, such as the wire 32, may also be used. Instead of a ground connection via the fastening element, such as the holding spring 30, clip, clamp, etc., it is also possible for the wire 32, or the like, to be coupled to the intermediate element 22 at a different point. Additionally, in some embodiments, the conductive insert (e.g., intermediate element 22) may be mounted to couple hydraulic lines at a different location, such as at a swirl pot or jet pump, or may be used in a different environment, such as in the supply of a heating system or a power plant.

Turning to FIG. 4, a method 100 for dissipating electric charge is shown. Method 100 comprises, at 102, pumping fuel from a fuel tank to an engine via a fuel pump. Fuel may be pumped to the engine in order to supply the fuel to injectors for injecting the fuel into combustion chambers, for example, where the fuel is used to power the engine. Pumping fuel to the engine comprises pumping fuel through a conductive insert coupling a fuel hose to an adapter at 104. The fuel hose may be coupled to the fuel pump, and may direct the fuel to the adaptor and eventually a fuel line, which may be coupled to one or more fuel injectors or a fuel rail. The fuel hose and the adapter may be coupled to each other at an outlet of the fuel tank. The hose and adapter may be fluidically coupled by the conductive insert in a releasable manner, such that they may be surely connected but may be easily released from each other.

At 106, method 100 comprises dissipating electrostatic charge. The electrostatic charge may be built up by the fuel being pumped through the fuel hose at 108. As explained above with respect to FIGS. 1-3, the fuel hose may include an interior that is conductive. As such, the electrostatic charge may be directed from the fuel hose to the conductive insert at 110. At 112, the charge may be directed from the conductive insert to the vehicle ground via a clamp and wire. As the conductive insert is made of conductive materials, it can direct the charge from the fuel hose to one or more conductive elements. In this embodiment, the clamp that secures the conductive insert to, for example, a flange of the fuel tank, may be conductive. Additionally, the clamp may be connected to a wire. Further, the wire may be connected to one or more grounded elements, such as the fuel pump, or a grounding cable. In this way, the charge from the fuel may be directed through the hose, to the conductive insert, and to the vehicle ground via the clamp and wire.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. For example, one embodiment includes a coupling system, comprising a first hydraulic hose electrically conductive only on an inside; a second hydraulic hose; an electrically conductive intermediate element with a first end projecting only partially into the first hydraulic hose; a releasable fastening element coupling the intermediate element to the second hydraulic hose; and a conducting device conductively coupled between vehicle ground and the intermediate element.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A coupling system, comprising
a first hydraulic line element that is electrically conductive at least on an inside;
a second hydraulic line element;
an electrically conductive intermediate element that projects by a first end thereof at least partially into the first hydraulic line element;
a releasable fastening element coupling the electrically conductive intermediate element to the second hydraulic line element; and
a conducting device coupled to a predetermined electric potential and connected in an electrically conductive manner to the electrically conductive intermediate element.

2. The coupling system as claimed in claim 1, wherein the first hydraulic line element is a hose-like element, and wherein the first hydraulic line element is electrically conductive only on an inside, and where the first end projects only partially into the first hydraulic line element, and where the predetermined electrical potential is vehicle ground.

3. The coupling system as claimed in claim 1, wherein the first and the second hydraulic line elements are part of a fuel supply system for an internal combustion engine or a heating system.

4. The coupling system as claimed in claim 1, wherein the first hydraulic line element is coupled to a fuel delivery module.

5. The coupling system as claimed in claim 1, wherein the second hydraulic line element is integrated in a flange.

6. The coupling system as claimed in claim 1, wherein the intermediate element has a collar-shaped bulge via which a flange-like fastening between the intermediate element and the second hydraulic line element can be provided by the fastening element.

7. The coupling system as claimed in claim 1, wherein the conducting device is coupled in an electrically conductive manner to the intermediate element via the fastening element.

8. The coupling system as claimed in claim 1, wherein the fastening element is a clamping spring.

9. The coupling system as claimed in claim 1, wherein the first end of the intermediate element has barbed-shaped elements that permit simple and durable coupling between the first hydraulic line element and the intermediate element.

10. The coupling system as claimed in claim 1, wherein the second end of the intermediate element is at least partially inserted into the second hydraulic line element and sealed with at least one sealing element.

11. The coupling system as claimed in claim 1, wherein the predetermined electric potential corresponds to a ground potential of a vehicle or a heating system.

12. A fuel system for a vehicle, comprising:
a fuel tank;
a fuel line configured to deliver fuel to an engine of the vehicle, the fuel line connected to a fuel hose of the fuel tank via an adapter; and
a conductive insert fluidically coupling the fuel hose to the adapter, the conductive insert comprised of conductive material and coupled to a wire via a fastening element.

13. The fuel system of claim 12, wherein the wire is connected to one or more grounding elements of the vehicle.

14. The fuel system of claim 13, wherein the one or more grounding elements comprises a fuel pump coupled to the fuel tank.

15. The fuel system of claim 12, wherein the fastening element comprises a holding spring made of conductive material.

16. The fuel system of claim 12, wherein the conductive insert is connected to the fuel hose via barb-shaped elements.

17. A method for dissipating electrostatic charge, comprising:
pumping fuel from a fuel tank to an engine through a conductive insert, the conductive insert configured to direct electrostatic charge to a conductive fastening element connected to a wire.

18. The method of claim 17, wherein the wire is connected to one or more grounded elements.

19. The method of claim 17, wherein pumping fuel from a fuel tank to the engine further comprises pumping fuel via a fuel pump, the fuel pump connected to the wire.

20. The method of claim 17, wherein the conductive insert is further configured to couple a fuel hose to an adapter and a fuel line in a releasable manner.

* * * * *